United States Patent
Hyde, Jr. et al.

(10) Patent No.: US 6,244,069 B1
(45) Date of Patent: Jun. 12, 2001

(54) APPARATUS FOR PRODUCING SOLID CARBON DIOXIDE

(75) Inventors: Charles M. Hyde, Jr., Roswell; N. Allen Wood; Daniel J. Rosewall, both of Cumming, all of GA (US)

(73) Assignee: CO2 Air Equipment, Inc., Cumming, GA (US)

( * ) Notice: Subject to any disclaimer, the term of this patent is extended or adjusted under 35 U.S.C. 154(b) by 0 days.

(21) Appl. No.: 09/520,045

(22) Filed: Mar. 7, 2000

(51) Int. Cl.[7] .................................................. B49C 43/00
(52) U.S. Cl. ............................................... 62/604; 62/341
(58) Field of Search ...................................... 62/604, 341

(56) References Cited

U.S. PATENT DOCUMENTS

| | | |
|---|---|---|
| 1,822,788 | 9/1931 | Stoffels . |
| 1,876,266 | 9/1932 | Weston . |
| 1,927,173 | 9/1933 | Jones et al. ............................. 62/121 |
| 2,016,815 | 10/1935 | Gilmore ................................. 62/121 |
| 2,120,943 | 6/1938 | Schutz .................................. 62/121 |
| 2,127,300 | 8/1938 | Kobold ................................. 62/121 |
| 3,098,361 | 7/1963 | Haase ...................................... 62/1 |
| 3,942,431 | 3/1976 | Goff ....................................... 100/53 |
| 4,374,658 * | 2/1983 | Kawaguchi ............................ 62/604 |
| 4,412,852 * | 11/1983 | Umino et al. .......................... 62/604 |
| 4,753,082 * | 6/1988 | Sudo et al. ............................. 62/604 |
| 4,770,684 * | 9/1988 | Tsukada et al. ........................ 62/604 |
| 5,419,138 | 5/1995 | Anderson et al. ....................... 62/35 |
| 5,528,907 | 6/1996 | Pint et al. .............................. 62/604 |
| 5,845,516 | 12/1998 | Allen, Jr. ............................... 62/605 |

* cited by examiner

*Primary Examiner*—Ronald Capossela
(74) *Attorney, Agent, or Firm*—Baker, Donelson, Bearman & Caldwell

(57) ABSTRACT

An apparatus (10) for producing carbon dioxide blocks is disclosed having a formation unit (14) which forms carbon dioxide blocks from carbon dioxide pellets conveyed to the formation unit (14). The formation unit includes a cylindrical hopper (17) having a floor (18) with a pair of openings (19) therein, a reciprocating sizing plate (23) positioned directly below the hopper (17) having a pair of sizing chambers (33) therein, a reciprocating forming plate (25) positioned below the sizing plate having a pair of forming chamber (38) therein, a flooring plate (26) positioned below the forming plate, and a conveying trough (27) positioned below the flooring plate. Furthermore, the unit also includes a hydraulic forming press (29) and a hydraulic ejection press (30).

21 Claims, 4 Drawing Sheets

APPARATUS FOR PRODUCING SOLID CARBON DIOXIDE

TECHNICAL FIELD

This invention relates to an apparatus for forming solid carbon dioxide blocks from carbon dioxide pellets, and particularly to an apparatus for forming solid carbon dioxide blocks of a specific preselected size.

BACKGROUND OF THE INVENTION

Solid carbon dioxide blocks have been produced for many years. Typically, these blocks are made by passing liquid carbon dioxide through a nozzle wherein the spray is allowed to expand in a sealed, cooled chamber. The adiabatic expansion of the liquid carbon dioxide freezes it into a solid in the form of carbon dioxide snow. This process is commonly referred to in the art as flashing. The carbon dioxide snow is then collected and compressed into blocks.

Many users of carbon dioxide blocks position the blocks within a specifically formed sleeve or compartment, for example within a sleeve of a beverage dispensing cart adapted to contain and cool beverages. As such, these users require that each block be formed within a very narrow range of block sizes so that they provide the largest volume of carbon dioxide while still properly fitting within the confines of the compartment.

In the past, in order to produce a carbon dioxide block of a select dimension producers have commenced with the formation of large carbon dioxide blocks. These large blocks were then cut with the use of a saw to produce smaller blocks having the desired block dimensions. This method of producing blocks of a selected measurement however has several associated problems. Firstly, band saws are typically used to cut the larger block into smaller blocks. These band saws however tend to bow or flex during usage. As such, the finished, smaller block may include a surface having waves and thus produce a block which may vary in width. Therefore, these smaller blocks may not be formed within the size tolerances required to fit within the container. Secondly, there are inherent difficulties in physically handling large, carbon dioxide blocks. These difficulties may cause the block to be mishandled during the cutting process, resulting in some blocks being cut too thin or too thick for its intended use. Thirdly, the use of saws, especially when associated with the cutting of difficult to handle carbon dioxide blocks, pose a danger to the operator.

To overcome the problems associated with the cutting of blocks to size, devices have been designed to produce small blocks of a select size. These devices typically have a container associated with the chamber producing the carbon dioxide snow so that the snow is collected within the container. A hydraulic press then compresses the snow within the container to produce a solid block. The volume of snow within the container prior to compression however is difficult to control and therefore the size of the finished block may fluctuate in accordance with the volume of snow within the container resulting in blocks of different sizes. Another problem associated with these devices is that the container is relocated during the pressing process. As such, the collection of carbon dioxide snow is temporarily halted during the pressing process, which greatly decreases the efficiency of the device.

Accordingly, it is seen that a need remains for an apparatus for producing solid carbon dioxide blocks of a predetermined select size in a safe and efficient manner. It is to the provision of such therefore that the present invention is primarily directed.

SUMMARY OF THE INVENTION

In a preferred form of the invention an apparatus for producing solid carbon dioxide comprises a collection chamber, a movable sizing plate, moving means for moving the sizing plate, a forming plate and a forming press. The collection chamber is adapted to contain a supply of carbon dioxide pellets, the collection chamber having an opening therein extending from a bottom surface of the collection chamber. The movable sizing plate has a sizing chamber therein extending between a top surface of the sizing plate and a bottom surface of the sizing plate, the top surface of the sizing plate being position closely adjacent the bottom surface of the collection chamber. The movable sizing plate is adapted for reciprocal movement between a first position with the sizing chamber generally aligned with the collection chamber opening and a second position with the sizing chamber distal the collection chamber opening. The forming plate has a forming chamber therein extending from a top surface of the forming plate, the top surface of the forming plate being position closely adjacent the bottom surface of the sizing plate and the forming chamber being aligned with the sizing chamber with the sizing plate in its second position. The press has a reciprocating press head sized and shaped to be received within the forming chamber of the forming plate so as to compress carbon dioxide pellets therein.

With this construction, the top surface of the forming plate creates a floor of the sizing chamber and carbon dioxide pellets within the collection chamber drop through the collection chamber opening and into the sizing chamber of the sizing plate, whereby with the movement of the sizing plate from its first position to its second position a maximum volume of carbon dioxide pellets is determined by the restrictive between the sizing plate and the adjacent bottom surface of the collection chamber and top surface of the forming plate, and whereby with the sizing chamber and forming chamber mutually aligned the volume of carbon dioxide pellets fall into the forming chamber so as to be compressed therein by the press.

DETAIL DESCRIPTION

Figure 1:
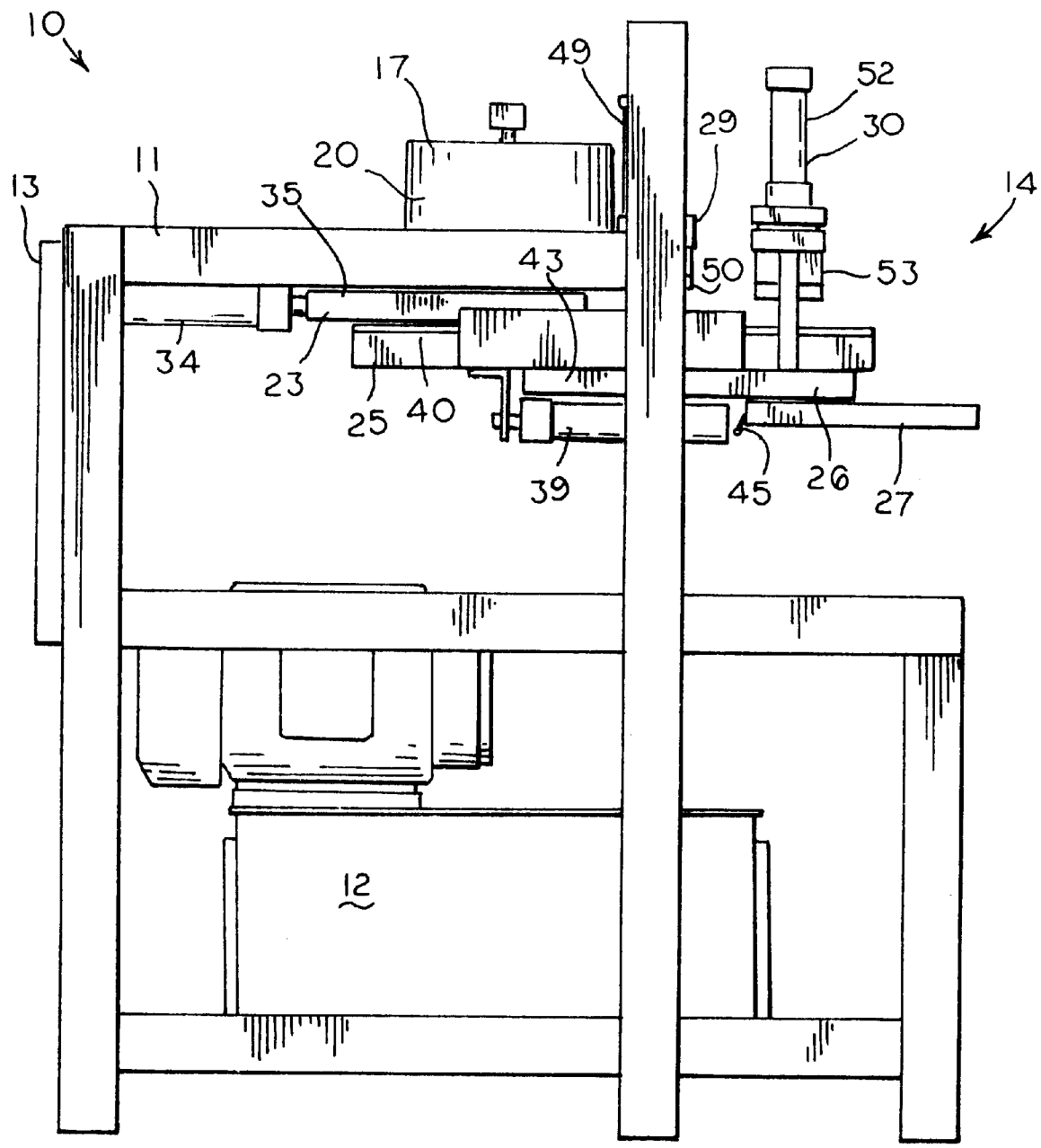
FIG. 1 is a side view of an apparatus for producing solid carbon dioxide in a preferred form of the invention.
Figure 2:
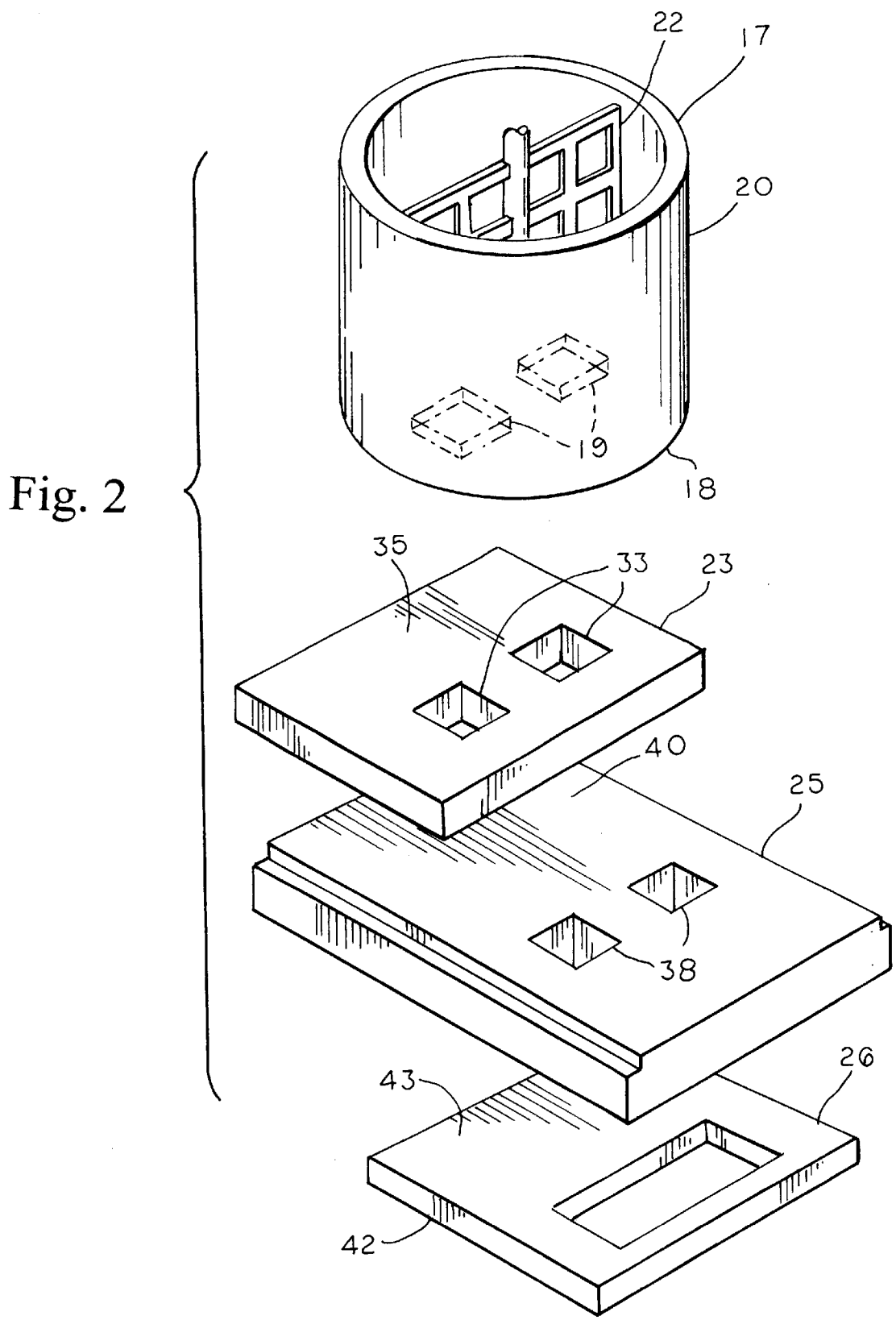
FIG. 2 is an exploded view of select portions of the apparatus of FIG. 1.

With reference next to FIGS. 1–7, there is shown an apparatus 10 for producing carbon dioxide blocks in a preferred form of the invention. The apparatus 10 has a frame 11 which supports the individual elements of the apparatus 10, the frame being eliminated in FIGS. 2–7 for clarity of explanation. The apparatus 10 includes a motorized hydraulic drive unit 12, a control circuit or controller 13 for coordinating the actuation of the apparatus elements, and a formation unit 14 which forms carbon dioxide blocks from carbon dioxide pellets conveyed to the formation unit 14.

The formation unit 14 includes a cylindrical collection chamber or hopper 17 positioned to receive carbon dioxide pellets P from an adjoining carbon dioxide pellet forming apparatus or apparatus for conveying carbon dioxide pellets. The hopper 17 has a floor 18 having a pair of openings 19 therein, insulated side walls 20 extending from the floor 18, and a motorized, rotating vein 22 therein for agitating the carbon dioxide pellets therein and positioning them over the floor openings 19.

The formation unit 14 also has a reciprocating sizing plate 23 positioned directly below the hopper 17, a reciprocating forming plate 25 positioned below the sizing plate 23, a flooring plate 26 positioned below the forming plate 25, and a conveying trough 27 positioned below the flooring plate 26. Furthermore, the unit also includes a hydraulic forming press 29 and a hydraulic ejection press 30.

The sizing plate 23 has two sizing chambers 33 therein extending between the top surface and the bottom surface of the sizing plate. The top surface of the sizing plate is positioned closely adjacent the bottom surface of the hopper floor 18. The sizing plate 23 is coupled to a hydraulic cylinder 34 which reciprocally positions the sizing plate 23 between a loading position, wherein the sizing chambers 33 are aligned with the hopper openings 19, and an unloading position with the sizing chambers 33 distal the hopper and aligned with the forming press 29. The sizing plate 23 has a closing portion 35 adjacent the sizing chambers 33 which closes the bottom opening 19 of the hopper 17 as the sizing plate 23 generally moves to and from its loading position.

The forming plate 25 has two forming chambers 38 therein extending between the top surface and the bottom surface of the forming plate. The top surface of the forming plate 25 is positioned closely adjacent the bottom surface of the sizing plate 23. The forming plate 25 is coupled to a hydraulic cylinder 39 which reciprocally positions the forming plate 25 between a forming position, wherein the forming chambers 38 are aligned with the forming press 29 and the sizing chambers 33 while the sizing plate is positioned in its unloading position, and an ejecting position with the forming chambers 38 aligned with the ejection press 30. The forming plate 25 has a closing portion 40 adjacent the forming chambers 38 which closes the bottom opening of the sizing chambers 33 as the sizing plate generally moves to and from its unloading position.

The flooring plate 26 has a large opening 42 therein extending between the top surface and the bottom surface of the flooring plate. The opening 42 is aligned with the ejection press 30 and the forming chambers 38 with the forming plate 25 in its ejecting position. The flooring plate 26 has a closing portion 43 adjacent the opening 42 which closes the bottom opening of the forming chambers 38 as the forming plate generally moves to and from its ejecting position.

The conveying trough 27 has a pair of movable fingers 45 extending through a slot in the floor 46 of the conveying trough. The fingers 45 are positioned so that actuation of the fingers causes them to contact and push forward carbon dioxide blocks positioned upon the floor 46 of the conveying trough 27.

The forming press 29 includes a hydraulic cylinder 49 coupled to a pair of press heads 50 sized and shaped to be received within the forming chambers 38 closely adjacent the side walls of the forming chambers. The hydraulic drive unit 12 preferably includes a 25 h.p. motor so as to provide the forming press with approximately 2,200 p.s.i of pressing force. The ejection press 30 includes a hydraulic cylinder 52 coupled to a pair of ejection heads 53 sized and shaped to be received within the forming chambers 38 closely adjacent the side walls of the forming chamber.

The controller 13 includes a microprocessor, such as a Simatic 57-200 made by Siemens Energy and Automation, Inc. of Bellefontaine, Ohio, which controls the actuation of the hopper rotating vein 22, the sizing plate hydraulic cylinder 34, the forming plate hydraulic cylinder 39, the forming press hydraulic cylinder 49, the ejection press hydraulic cylinder 52 and the conveying trough fingers 45, the hydraulic cylinders 34, 39, 49 and 52 being hydraulically coupled to hydraulic drive unit 12.

Figure 3:
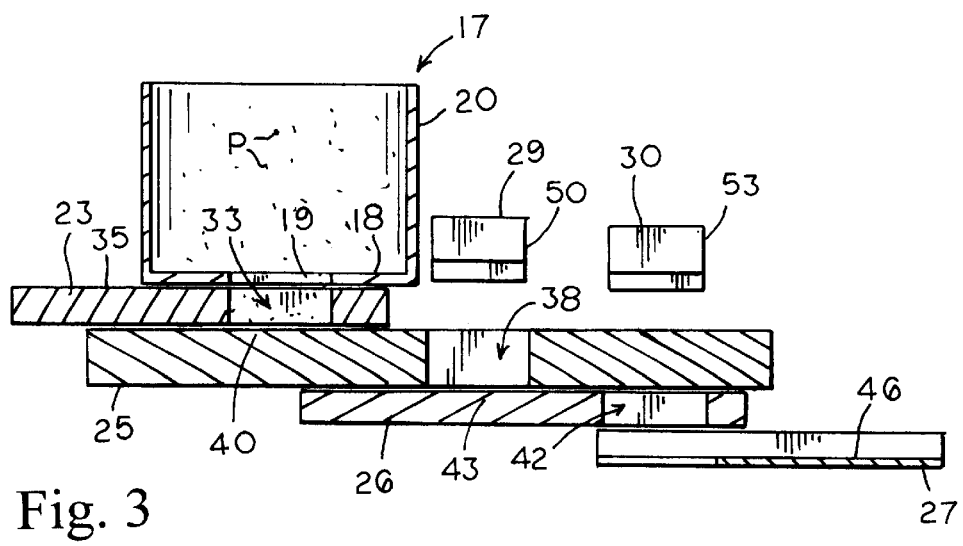
FIGS. 3–7 are a sequence of views showing a portion of the apparatus of FIG. 1, which shown in sequence, the actuation of the apparatus.
Figure 4:
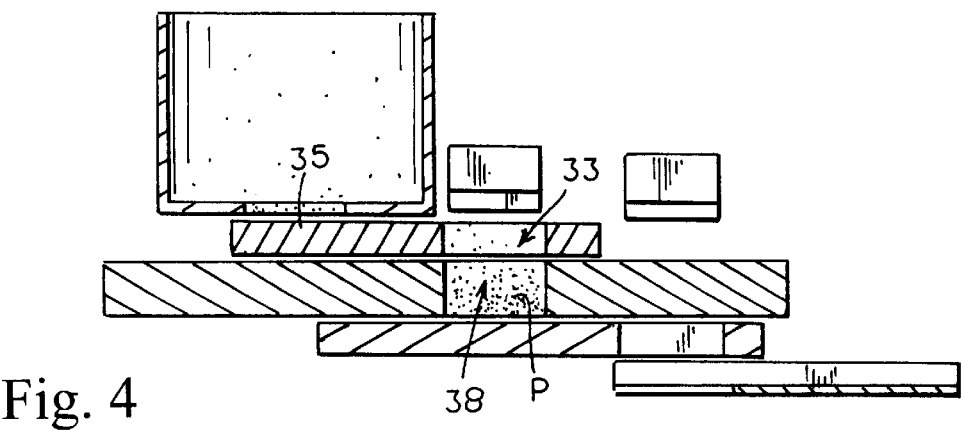

In use, carbon dioxide pellets P, measuring approximately ⅛–¼ inch in diameter and ½–1 inch in length, are fed into the hopper 17 wherein the actuation of the rotating vein 22 prevents the pellets from freezing together and positions the pellets over the hopper opening 19. With the sizing plate 23 in its loading position, as shown in FIG. 3, pellets P fall through the hopper opening 19 and into the sizing chambers 33 of the sizing plate 23. After a preselected time interval, long enough to ensure the sizing chambers 33 are overly filled with pellets, the control circuit 13 actuates the sizing plate hydraulic cylinder 34 so that the sizing plate moves from its loading position to its unloading position, as shown in FIG. 4. As the sizing plate 23 moves from its loading position to its unloading position the volume of carbon dioxide pellets associated with each sizing chamber P is limited by height of the sizing chamber, as pellets above the level of the sizing plate are scraped off at the top surface of the sizing plate by the sidewalls of the hopper opening 19 or otherwise prevented from following the sizing chamber, and thereby retained within the hopper 17 as the closing portion 35 of the sizing plate 23 seals the hopper opening 19, i.e. the tolerances between the bottom surface of the hopper and the top surface of the sizing plate blocks and prevents the release of pellets from the hopper opening 19 as the sizing plate moves to its unloading position. The limiting of the pellets to the height of the sizing plates enables a precise volume of pellets to be collected with each cycling of the sizing plate.

Figure 5:
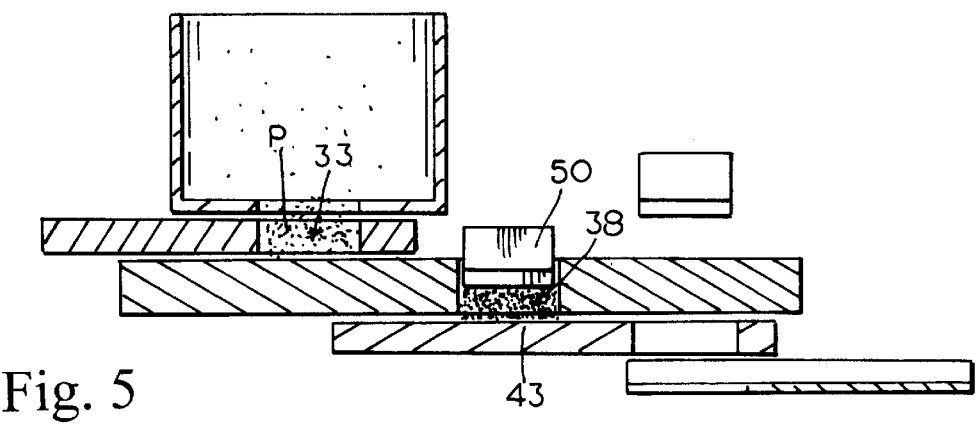
Figure 6:
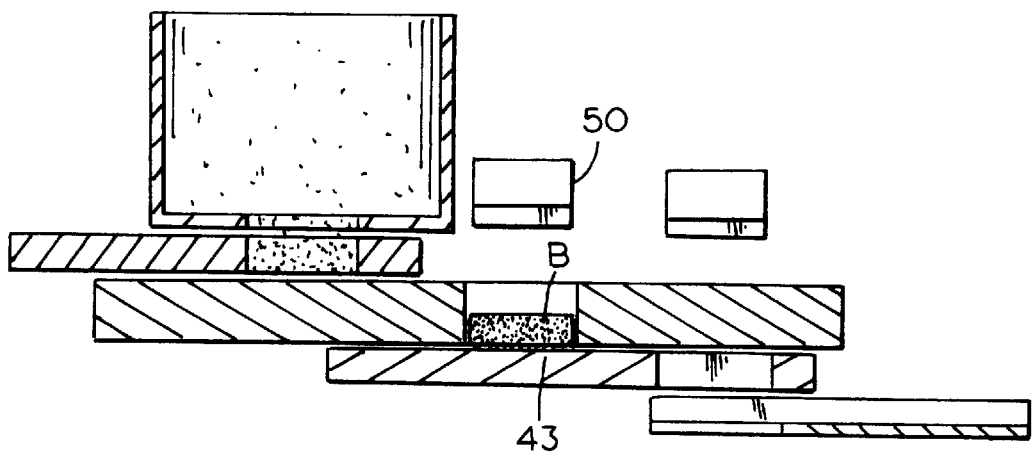

With the sizing chambers 33 now aligned with the forming chambers 38, with the forming plate 25 in its forming position, the pellets residing within the sizing chambers 33 drop into the underlying forming chamber 38. Once a sufficient time interval has elapsed to allow the pellets to fall into and settle within the forming chambers 38 the controller then reverses the actuation of the sizing plate hydraulic cylinder 34 so that the sizing plate 23 returns to its loading position. As another supply of carbon dioxide pellets drop into the sizing chambers 33 the controller actuates the forming press hydraulic cylinder 39 to that the forming press heads 50 pass into the forming chambers 38. The passage of the forming press heads 50 into the forming chamber 38 compresses the carbon dioxide pellets P within the forming chamber with sufficient force to form a solid block of carbon dioxide B, as shown in FIG. 5. The forming press heads 50 are then withdrawn leaving the formed carbon dioxide blocks B residing within the forming chambers 38, as shown in FIG. 6. As the volume of carbon dioxide pellets is maintained in a precise quantity with each cycling of the apparatus 10 it should be understood that the resulting solid carbon dioxide blocks are all substantially the same height.

Figure 7:
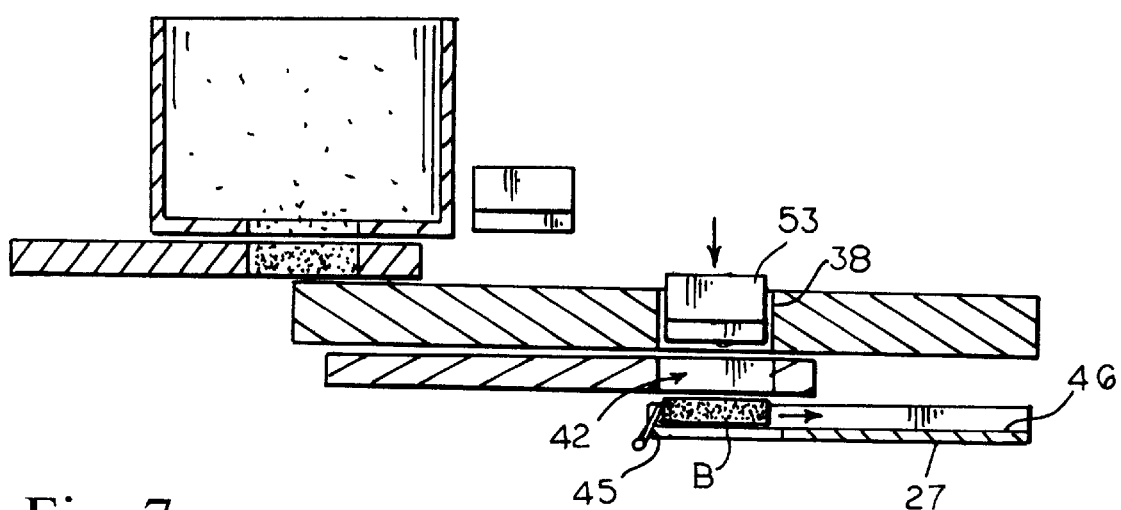

With the carbon dioxide blocks B now formed within the forming chambers 38 the controller actuates the forming plate hydraulic cylinder 39 so as to move the forming plate to its ejection position aligned with the ejection press 30 and the opening 42 within the flooring plate 26. The controller 13 then actuates the ejection press 30 so that the ejection press heads 53 pass into the forming chambers thereby forcibly ejecting the formed carbon dioxide blocks B through the bottom opening of the forming chamber 38. The ejected blocks B pass through the flooring plate opening 42 and onto the conveying trough 27, as shown in FIG. 7. Lastly, the controller 13 actuates the fingers 45 so as to move the formed blocks along the conveying trough 27 towards a collection area.

The just described embodiment enables the loading of the sizing chambers 33 to be conducted during the same time the hydraulic presses form the blocks. As such, this apparatus enables two operations to be conducted simultaneously, thereby increasing its efficiency. This apparatus may also be adjusted to produce blocks of another size by merely changing the size of the sizing plate, and thereby the sizing chamber, to change to volume of carbon dioxide pellets collected with each cycling of the apparatus.

It should be understood that the conveying trough may also be set at an incline to facilitate the movement of the formed blocks or even to eliminate the need for the moving fingers 45. Furthermore, other types of devices such as pneumatic cylinders, mechanical presses and linkages, and other conventionally known devices for articulating mechanical movement may be used as an equivalent substitution of the hydraulic cylinders shown in the preferred embodiment. It should also be understood that the apparatus is not limited to the dual formation of blocks as shown in the preferred embodiment, as the apparatus may include any number hopper openings, sizing chamber and forming chambers. It should be understood that the term pellets as used herein includes all types of carbon dioxide particles, including but not limited to snow, flakes, shavings, and is not limited to particles in actual pellet form.

As an alternative to the flooring plate having a large opening therethrough the flooring plate may terminate so that the formed block simply passes past the end of the flooring plate as they are ejected from the forming chamber. As another alternative, the flooring plate 26 may be moved while the forming plate is maintained stationary instead of the forming plate moving relative to the stationary flooring plate. Similarly, movement of the hopper 17 relative to the stationary sizing plate is an equivalence of the previously described preferred embodiment. As such, relative movement between two items should be understood to be an equivalence to the movement of the two items shown in the preferred embodiment.

While this invention has been described in detail is particular reference to the preferred embodiment thereof, it should be understood that many modifications, additions and deletions, in addition to those expressly recited, may be made thereto without departure from the spirit and scope of the invention as set forth in the following claims.

What is claimed is:

1. An apparatus for producing solid carbon dioxide comprising,
    a collection chamber adapted to contain a supply of carbon dioxide pellets, said collection chamber having an opening therein extending from a bottom surface of said collection chamber;
    a movable sizing plate having a sizing chamber therein extending between a top surface of said sizing plate and a bottom surface of said sizing plate, said top surface of said sizing plate being position closely adjacent said bottom surface of said collection chamber, said movable sizing plate being adapted for reciprocal movement between a first position with said sizing chamber generally aligned with said collection chamber opening and a second position with said sizing chamber distal said collection chamber opening;
    first moving means for reciprocally moving said sizing plate;
    a forming plate having a forming chamber therein extending from a top surface of said forming plate, said top surface of said forming plate being position closely adjacent said bottom surface of said sizing plate and said forming chamber being aligned with said sizing chamber with said sizing plate in its second position; and
    a press having a reciprocating press head sized and shaped to be received within said forming chamber of said forming plate so as to compress carbon dioxide pellets therein,
    whereby with the top surface of the forming plate creating a floor of the sizing chamber, carbon dioxide pellets within the collection chamber drop through the collection chamber opening and into the sizing chamber of the sizing plate, and whereby with the movement of the sizing plate from its first position to its second position a maximum volume of carbon dioxide pellets is determined by the restrictive between the sizing plate and the adjacent bottom surface of the collection chamber and top surface of the forming plate, and whereby with the sizing chamber and forming chamber mutually aligned the volume of carbon dioxide pellets fall into the forming chamber so as to be compressed therein by the press.

2. The apparatus of claim 1 wherein said forming chamber extends through said forming plate to said bottom surface of said forming plate, and wherein said apparatus further comprises a flooring plate having a top surface positioned closely adjacent said bottom surface of said forming plate.

3. The apparatus of claim 2 wherein said forming plate is reciprocally movable between a first position with said forming chamber aligned with said sizing chamber with the sizing plate in its second position, and a second position wherein said forming chamber is unobstructed by said flooring plate.

4. The apparatus of claim 3 further comprising collection means mounted adjacent said flooring plate for collecting the formed solid carbon dioxide.

5. The apparatus of claim 1 further comprising ejection means for ejecting the formed solid carbon dioxide from said forming chamber.

6. The apparatus of claim 3 further comprising ejection means for ejecting the formed solid carbon dioxide from said forming chamber with the forming plate in its second position.

7. The apparatus of claim 1 wherein said sizing plate includes a closing portion sized and shaped to close said collection chamber opening with said sizing plate in its second position.

8. The apparatus of claim 1 wherein said forming plate includes a closing portion sized and shaped to close said sizing chamber with said sizing plate in its first position.

9. The apparatus of claim 8 wherein said sizing plate includes a closing portion sized and shaped to close said collection chamber opening with said sizing plate in its second position.

10. The apparatus of claim 1 further comprising means for forcing carbon dioxide pellets within said collection chamber through said collection chamber opening.

11. An apparatus for producing solid carbon dioxide comprising,
    a collection chamber adapted to contain a supply of carbon dioxide pellets, said collection chamber having an opening therein terminating at a bottom edge;
    a movable sizing chamber having a top opening extending from a top edge of said chamber and a bottom opening extending from a bottom edge of said sizing chamber, said top edge being position closely adjacent said bottom edge of said collection chamber opening, said movable sizing chamber being adapted for reciprocal movement between a first position with said sizing chamber generally aligned with said collection chamber opening and a second position with said sizing chamber distal said collection chamber opening;

first moving means for reciprocally moving said sizing chamber;

a forming chamber having a top opening extending from a top edge of the forming chamber, said forming chamber being positionable to receive carbon dioxide pellets from said sizing chamber with said sizing chamber in its second position;

means for providing a floor for said sizing chamber with said sizing chamber in its first position; and a press having a reciprocating press head sized and shaped to be received within said forming chamber so as to compress carbon dioxide pellets therein, whereby carbon dioxide pellets within the collection chamber pass through the collection chamber opening and into the sizing chamber whereby the movement of the sizing chamber from its first position to its second position and the close proximity of the collection chamber opening bottom edge to the sizing chamber top edge limits the volume of carbon dioxide pellets to a select maximum.

12. The apparatus of claim 11 wherein said forming chamber has a bottom opening extending from a bottom surface of said forming chamber, and wherein said apparatus further comprises a flooring plate having a top surface positioned closely adjacent said bottom surface of said forming chamber.

13. The apparatus of claim 12 wherein said forming chamber is reciprocally movable between a first position with said forming chamber aligned with said sizing chamber with the sizing chamber in its second position, and a second position wherein said forming chamber is unobstructed by said flooring plate.

14. The apparatus of claim 13 further comprising collection means mounted adjacent said flooring plate for collecting the formed solid carbon dioxide.

15. The apparatus of claim 11 further comprising ejection means for ejecting the formed solid carbon dioxide from said forming chamber.

16. The apparatus of claim 13 further comprising ejection means for ejecting the formed solid carbon dioxide from said forming chamber with the forming chamber in its second position.

17. The apparatus of claim 11 further comprising a collection chamber closing member sized and shaped to close said collection chamber opening with said sizing chamber in its second position.

18. The apparatus of claim 17 wherein said collection chamber closing member comprises a sizing plate and wherein said sizing chamber is defined by an opening within said sizing plate.

19. The apparatus of claim 11 further comprising a sizing chamber closing member sized and shaped to close said sizing chamber bottom opening with said sizing chamber in its first position.

20. The apparatus of claim 19 further comprising a collection chamber closing member sized and shaped to close said collection chamber opening with said sizing chamber in its second position.

21. The apparatus of claim 18 wherein said sizing chamber closing member comprises a forming plate and wherein said forming chamber is defined by an opening within said forming plate.

* * * * *